(12) United States Patent
Zhang et al.

(10) Patent No.: US 12,205,564 B2
(45) Date of Patent: Jan. 21, 2025

(54) METHOD AND DEVICE FOR DISPLAYING MUSIC SCORE IN TARGET MUSIC VIDEO

(71) Applicant: SHANGHAI BILIBILI TECHNOLOGY CO., LTD., Shanghai (CN)

(72) Inventors: Yang Zhang, Shanghai (CN); Jingying Lin, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 731 days.

(21) Appl. No.: 17/464,633

(22) Filed: Sep. 1, 2021

(65) Prior Publication Data
US 2022/0068248 A1    Mar. 3, 2022

(30) Foreign Application Priority Data

Sep. 3, 2020  (CN) .......................... 202010917788.8

(51) Int. Cl.
    G10G 1/04        (2006.01)
    G06F 3/04845     (2022.01)
    G06F 16/63       (2019.01)
    G06F 16/683      (2019.01)
    (Continued)

(52) U.S. Cl.
    CPC ........... *G10G 1/04* (2013.01); *G06F 3/04845* (2013.01); *G06F 16/63* (2019.01); *G06F 16/683* (2019.01); *G10H 1/0008* (2013.01); *G09B 15/023* (2013.01); *G10H 2210/056* (2013.01); *G10H 2210/086* (2013.01); *G10H 2220/015* (2013.01);
    (Continued)

(58) Field of Classification Search
    CPC ......... G10G 1/04; G06F 16/63; G06F 16/683; G06F 3/04845; G09B 15/023; G10H 1/0008; G10H 2110/056; G10H 2210/086; G10H 2220/015; G10H 2220/091; G10H 2240/125; G10H 2240/131
    USPC .......................................................... 84/624
    See application file for complete search history.

(56) References Cited

U.S. PATENT DOCUMENTS 7,548,875 B2 *  6/2009  Mikkelsen .............. H04L 69/04
                                               705/26.8
7,649,134 B2 *  1/2010  Kashioka ................. G10G 1/00
                                                 84/486
(Continued)

FOREIGN PATENT DOCUMENTS

CN     101103386 A  *  1/2008  .......... G09B 15/023
CN     101790056 A     7/2010
(Continued)

*Primary Examiner* — Christina M Schreiber
(74) *Attorney, Agent, or Firm* — BakerHostetler

(57) ABSTRACT

The present application provides techniques for displaying music score segments in target music videos. The techniques comprise determining a digital music score corresponding to a piece of music comprised in a target music video; determining a segment of the digital music score corresponding to a current playing progress of the target music video based at least in part on a playing progress of the target music video; generating an image of a music score segment corresponding to the segment of the digital music score based on a predetermined condition; and presenting the image on a corresponding interface of playing the target music video.

20 Claims, 5 Drawing Sheets

(51) Int. Cl.
  *G09B 15/02* (2006.01)
  *G10H 1/00* (2006.01)
(52) U.S. Cl.
  CPC . *G10H 2220/091* (2013.01); *G10H 2240/125* (2013.01); *G10H 2240/131* (2013.01)

(56) References Cited

U.S. PATENT DOCUMENTS

| | | | | |
|---|---|---|---|---|
| 7,754,959 | B2* | 7/2010 | Herberger | G11B 27/031 84/622 |
| 10,262,641 | B2* | 4/2019 | Silverstein | G10H 1/00 |
| 2002/0046638 | A1* | 4/2002 | Wright | G09B 15/023 84/612 |
| 2008/0196575 | A1* | 8/2008 | Good | G09B 15/04 84/470 R |
| 2013/0283999 | A1* | 10/2013 | Clarke | G09B 15/02 84/477 R |
| 2015/0179156 | A1* | 6/2015 | Uemura | G06V 30/422 84/609 |
| 2016/0322081 | A1* | 11/2016 | Schileru | H04N 21/812 |
| 2017/0308927 | A1* | 10/2017 | Woods | G06Q 30/0277 |
| 2020/0105303 | A1* | 4/2020 | Conejo | G11B 27/005 |
| 2021/0195284 | A1* | 6/2021 | Song | H04N 21/4722 |
| 2022/0051448 | A1* | 2/2022 | Steinwedel | H04N 21/41407 |
| 2022/0068248 | A1* | 3/2022 | Zhang | G10G 1/04 |
| 2022/0293136 | A1* | 9/2022 | Wang | H04N 21/47217 |

FOREIGN PATENT DOCUMENTS

| | | | | |
|---|---|---|---|---|
| CN | 102420910 | A | | 4/2012 |
| CN | 108986841 | A | | 12/2018 |
| CN | 111683209 | A * | 9/2020 | G06F 16/48 |
| CN | 112269898 | A * | 1/2021 | |
| CN | 112598961 | A * | 4/2021 | |
| CN | 113486214 | A * | 10/2021 | |
| CN | 113572981 | A * | 10/2021 | |
| CN | 111491211 | B * | 1/2022 | H04N 21/439 |
| CN | 113971945 | A * | 1/2022 | |
| JP | S61-225986 | A | | 10/1986 |
| JP | 2018537727 | A * | 12/2018 | |
| KR | 20130015173 | A * | 2/2013 | |
| WO | WO-2015114216 | A3 * | 11/2015 | G06F 17/30056 |

\* cited by examiner

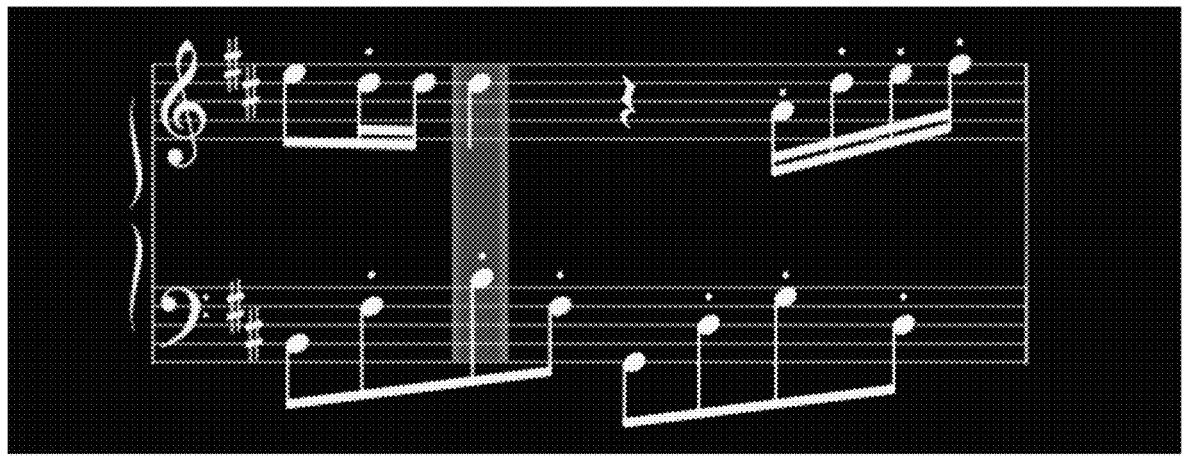
Fig. 3(a)
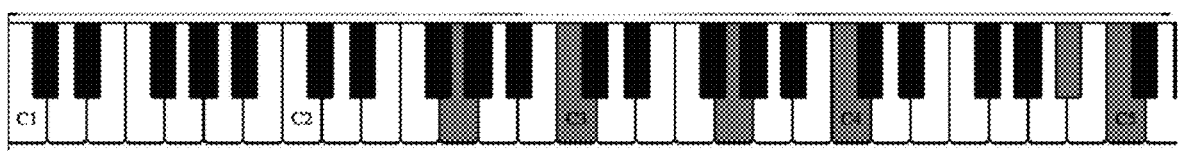
Fig. 3(b)
Fig. 3(c)

METHOD AND DEVICE FOR DISPLAYING MUSIC SCORE IN TARGET MUSIC VIDEO

CROSS-REFERENCE TO RELATED APPLICATION

The present invention claims priority of Chinese patent application filed on Sep. 3, 2020, with an application number CN 202010917788.8 and a name of method and device for displaying music score in target music video". The entire content of the above-identified application is incorporated in the present invention by reference.

BACKGROUND

In the prior art, when playing music videos, users can only watch the videos, but if they want to have a more professional music knowledge about the music involved in the video, it cannot be achieved, resulting in low user experience. Therefore, there is an urgent need for a way to increase user experience when playing music videos.

SUMMARY

The purpose of the present application is to provide a method and a device for displaying music score in target music video to solve the problem that music scores cannot be displayed in a music video in the prior art.

According to one aspect of the present application, a method for displaying music scores in target music video is provided, wherein the method includes: determining a digital music score corresponding to a piece of music comprised in a target music video; determining a segment of the digital music score corresponding to a current playing progress of the target music video based at least in part on a playing progress of the target music video; generating an image of a music score segment corresponding to the segment of the digital music score based on a predetermined condition; and presenting the image on a corresponding interface of playing the target music video.

According to another aspect of the present application, a computer-readable medium is also provided, which stores computer-readable instructions, and the computer-readable instructions can be executed by a processor to implement the above method.

According to another aspect of the present application, a device for displaying music score in target music video is also provided, wherein the device includes: at least one processor; and at least one memory communicatively coupled to the at least one processor and comprising computer-readable instructions that upon execution by the at least one processor cause the at least one processor to perform operations, the operations comprising: determining a digital music score corresponding to a piece of music comprised in a target music video; determining a segment of the digital music score corresponding to a current playing progress of the target music video based at least in part on a playing progress of the target music video; generating an image of a music score segment corresponding to the segment of the digital music score based on a predetermined condition; and presenting the image on a corresponding interface of playing the target music video.

Compared with the prior art, the present application determines a digital music score of music corresponding to a target music video, and determines the digital score segment matched with a current playing progress of the target music video based on a playing progress of the target music video and the digital music score, and then renders the digital music score segment to generate a corresponding music score segment image based on a preset condition, and presents the music score segment image on a playing interface corresponding to the target music video. In this way, the display of music score segments in the music video is implemented, which enables the user to obtain the corresponding music score while watching the video, increases the way for the user to learn music, and improves the user experience.

Moreover, the present application can also present the music score segment image on the playing interface corresponding to the target music video in the form of comments, and adjust the presentation form of the music score segment image on the playing interface corresponding to the target music video based on the user's adjustment operation of the music score segment image, which increases the user experience by the way of comments, moreover, the user can adjust the music score segment image, which increases the flexibility of the presentation effect.

BRIEF DESCRIPTION OF THE DRAWINGS

Other features, objects and advantages of the present invention will become more apparent by reading the detailed description of the non-limiting embodiments with reference to the following drawings:

FIG. 3 (a), FIG. 3 (b) and FIG. 3 (c) show three preferred music score segment images;

Figure 1:
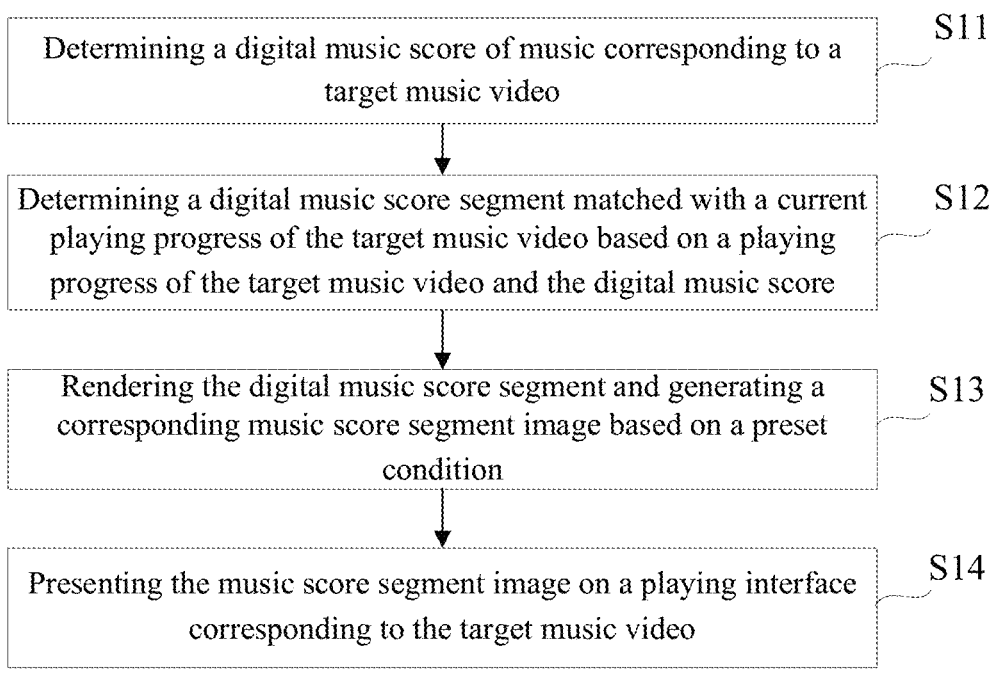
FIG. 1 shows a flowchart of a method for displaying music score in target music video according to an aspect of the present application.

The same or similar reference signs in the drawings represent the same or similar components.

DETAILED DESCRIPTION OF ILLUSTRATIVE EMBODIMENTS

The present invention will be further described in detail in combination with the drawings.

In a typical configuration of the present application, a terminal, a device serving the network and a trusted party all comprise one or more processors (CPU), input/output interfaces, network interfaces and memory.

The memory may include non-permanent memory, Random Access Memory (RAM) and/or a non-volatile memory in computer-readable media, such as Read-Only Memory (ROM) or flash RAM. The memory is an example of a computer-readable medium.

The computer-readable medium includes permanent and non-permanent, removable and non-removable media, and information storage can be implemented by any method or technology. The information can be computer-readable instructions, data structures, program modules, or other data. Examples of computer storage medium include, but are not limited to, Phase-Change RAM (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memory technologies, CD-ROM, Digital Versatile Disc (DVD) or other optical storage, Magnetic cassettes, magnetic tape disk storage or other magnetic storage devices or any other non-transmission media, which can be used to store information that can be accessed by computing devices. According to the definition in this article, computer-readable medium does not include non-transitory computer-readable media (transitory media), such as modulated data signals and carrier waves.

In order to further elaborate the technical means adopted in the present application and the obtained effect, the technical scheme of the present application is described clearly and completely in combination with the attached drawings and the better embodiment.

FIG. 1 shows a flowchart of a method for displaying music score in target music video according to an aspect of the present application, the method is executed by a device 1, and the method includes the following steps:

S11 determining a digital music score of music corresponding to a target music video;

S12 determining a digital music score segment matched with a current playing progress of the target music video based on a playing progress of the target music video and the digital music score;

S13 rendering the digital music score segment to generate a corresponding music score segment image based on a preset condition;

S14 presenting the music score segment image on a playing interface corresponding to the target music video.

In the present application, the method is executed by the device 1, and the device 1 includes at least any one of a user terminal device or a network device. Specifically, the above steps may be executed by the user terminal device, or some steps may be executed by the user terminal device and some steps may be executed by the network device, so as to be implemented by the cooperation of the user device and the network device, which is not limited in the present solution. Wherein, when the device 1 is a network device, the device 1 includes, but is not limited to, a computing device and/or cloud. The computing device includes, but is not limited to, a personal computer, a notebook computer, an industrial computer, a network host, a single network server, and multiple network server sets; the cloud is composed of a large number of computers or network servers based on Cloud Computing, wherein, the Cloud Computing is a kind of distributed computing, which is a virtual supercomputer composed of a group of loosely coupled computer sets.

When the device 1 is a user terminal device, the device 1 includes but is not limited to various intelligent terminals, such as smart phones, mobile intelligent devices, personal computers, etc. Herein, the computing device and/or the cloud are only examples, and other existing or possible future device and/or resource sharing platforms, if applicable to the present application, shall also be included in the protection scope of the present application, and are included here by reference.

In the embodiment, in the step S11, the digital music score of the music corresponding to the target music video is determined. Wherein, the target music video includes video contents and corresponding music contents. In the step, the digital music score corresponding to the music contents needs to be determined. Specifically, the user can search for corresponding digital music score according to the music, and upload the searched digital music score to the device 1.

Preferably, wherein, the step S11 includes: searching in a digital music score database based on the target music video to determine the digital music score corresponding to the target music video.

In the embodiment, a digital score database can be established in advance, and the digital score database can be saved according to a music name or an audio track, and then search in the digital score database according to the music name or the audio track corresponding to the target music video to determine the digital score corresponding to the target music video. Herein, the search method is only an example and is not specifically limited.

Preferably, wherein, the establishment of the digital music score database includes: separating a corresponding audio from an obtained music video and separating different audio tracks from the audio; generating the digital music score corresponding to the audio based on the different audio tracks to establish the digital music score database. Through the establishment of the digital music score database, it is convenient to search the corresponding digital music score.

Specifically, a large number of music videos can be obtained in advance and the corresponding audios can be separated from the obtained music videos, and then different audio tracks can be separated from the corresponding audios. Then, the digital music scores corresponding to the audios are generated and saved based on the different audio tracks, so as to establish the digital music score database. Specifically, the audio track can be converted into MIDI (Musical Instrument Digital Interface), and information such as sound frequency, amplitude, and waveform in an MIDI file can be analyzed to generate a corresponding digital score database.

In addition, the user can also upload a corresponding digital score to create or update the digital score database. The above method of establishing a digital music score database is only an example, and other existing or possible future methods, if applicable to the present application, shall also be included in the protection scope of the present application, and are included herein by reference.

Continuing in the embodiment, in the step S12, the device 1 determines the digital music score segment matched with the current playing progress of the target music video based on the playing progress of the target music video and the digital music score.

Specifically, the digital music score segment can be marked with time units, and then playing progress time information of the target music video can be corresponded to time information of the digital music score to determine a time point of the digital music score corresponding to a time point of the current playing progress, and digital score between the time point of the current playing progress and a time point of a next preset time interval is determined as the digital music score segment matched with the current playing progress of the target music video. Through the way of time marking, the corresponding digital music score segment can be matched quickly, and the matching efficiency is improved.

Preferably, wherein, the method further includes: S15 (not shown) analyzing the digital music score to determine a corresponding digital music score data structure; wherein, the step S12 includes:

determining the digital music score segment matched with the playing progress of the target music video based on the playing progress of the target music video and the digital music score data structure corresponding to the digital music score.

In the embodiment, data structure information of the digital music score can be determined through the analysis of the digital music score. The data structure information is configured to accurately record the digital music score, and the data structure information corresponds to the whole music process, so that the playing progress of the target music video and the digital music score data structure corresponding to the digital music score can be matched to determine a data structure part corresponding to the current playing progress. Then, the data structure part corresponding to the current playing progress and time structure part of a next preset segment are regarded as the digital music score segment matching the playing progress of the target music video.

Herein, the above method of determining the digital music score segment matching the current playing progress of the target music video is only an example, and other existing or possible methods in the future, if applicable to the application, should also be included in the protection scope of the application, and are included herein by reference.

Preferably, wherein, the method further includes: S16 (not shown) adjusting the digital music score data structure when the digital music score segment does not match the playing progress of the target music video.

In the embodiment, if the digital music score segment cannot match the playing progress of the target music video, the digital music score data structure can be adjusted accordingly to make the digital music score segment match the playing progress of the target music video.

Continuing in the embodiment, in the step S13, rendering the digital music score segment to generate the corresponding music score segment image based on the preset condition.

Figure 2:
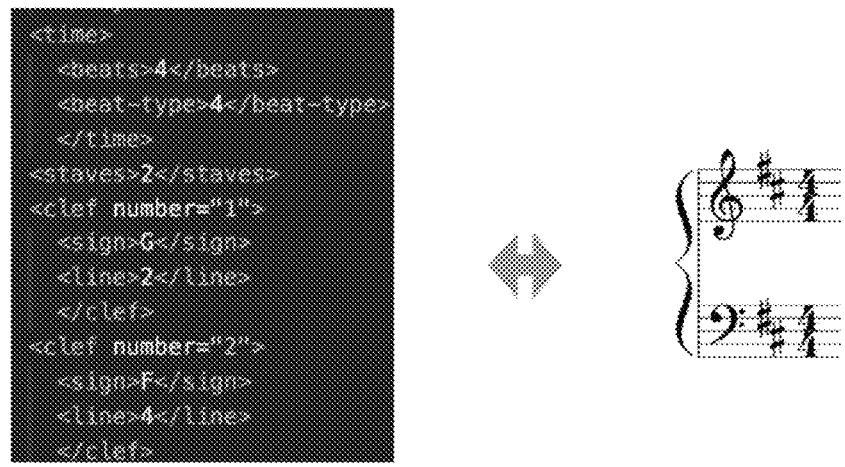
FIG. 2 shows a preferred rendering example of the present application.

For example, MusicXML is a file format developed by W3C for recording music scores. Based on XML, many programs can render music scores with it. FIG. 2 shows a preferred rendering example of the present application.

Specifically, in order to make the user have a better experience, the digital music score segment will be rendered to generate the corresponding music score segment image. Specifically, for the same digital music score segment, it can be rendered into different forms of music score segment images such as staff score, numbered musical notation, musical instrument fingering, etc. The specific rendered image can be limited based on the preset condition. Herein, the music score segment image is only an example, and other graphical forms that can be applied to the present application are also included in the application. As shown in FIG. 3 (a), FIG. 3 (b) and FIG. 3 (c), respectively show the music score segment images corresponding to the staff score, the numbered musical notation, and piano fingering.

Preferably, wherein, the preset condition includes any one of the following: a current selection operation on a type of the music segment image by a user; a historical selection operation on a type of the music segment image by a user; a musical instrument corresponding to the target music video.

Wherein, when the preset condition is the current selection operation of the type of the music score segment image by the user, the user can select a desired type of the music score segment image by himself. For example, the device 1 may provide a selection button for the user to select. Wherein, the types of the music score segment images include, but are not limited to, different types such as staff score, numbered notation, guitar notation, and musical instrument fingering.

When the preset condition is the historical selection operation of the type of the musical score segment image by the user, the device 1 can automatically determine the type for the user according to the historical selection operation by the user. For example the type frequently selected by the user can be determined as the current type of the musical score segment image, or, the type last selected is taken as the current type of the music score segment, etc.

When the preset condition is the musical instrument corresponding to the target music video, the method further includes determining the musical instrument corresponding to the music in the target music video, and rendering the digital music score segment to generate a music score segment image corresponding to the musical instrument. For example, the fingering of the musical instrument is provided to the user as a music score segment image. For example, if it is determined that the musical instrument is a piano, the piano fingering segment image may be provided to the user.

Continuing in the embodiment, in the step S14, presenting the music score segment image on a playing interface corresponding to the target music video. Specifically, the music score segment image may be covered over the target music video to be presented to the user.

Preferably, wherein, the step S14 includes: presenting the music score segment image on the playing interface corresponding to the target music video in a form of the music score segment image moving relative to at least one frame of the target music video. Specifically, the music score segment image can be presented on the playing interface corresponding to the target music video in a form similar to text comments, and the music score segment image changes with time.

Figure 4:
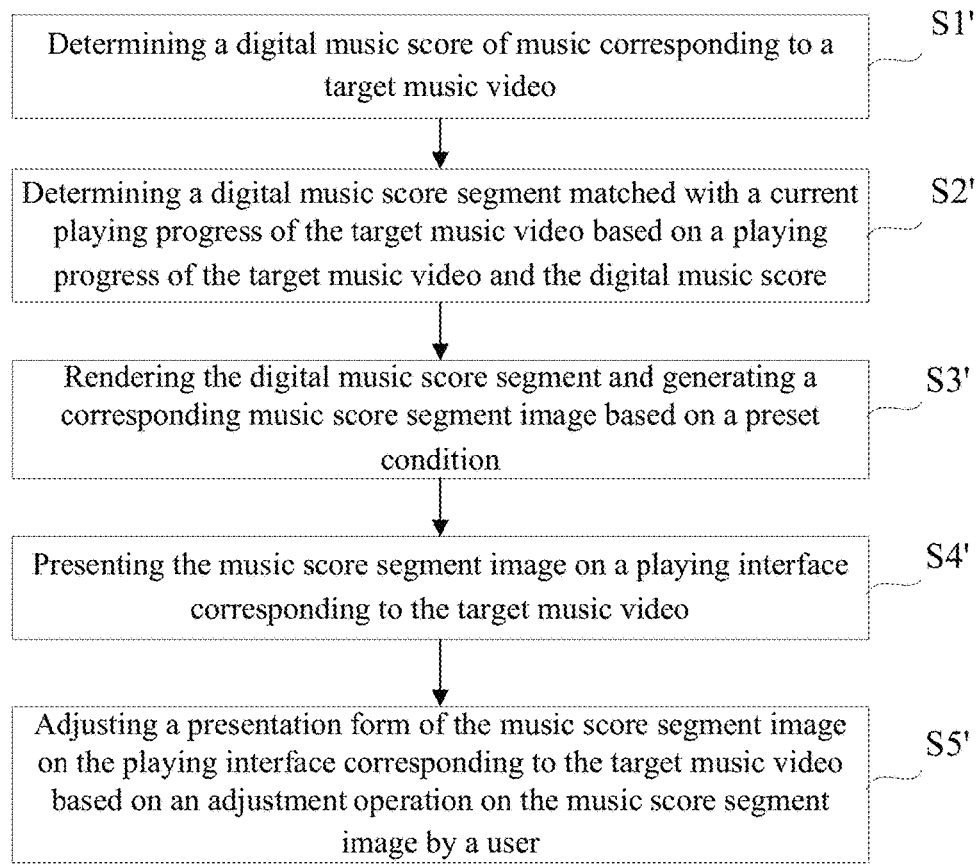
FIG. 4 shows a flowchart of a method for displaying music score in target music video according to a preferred embodiment of the present application.

In a preferred embodiment, referring to FIG. 4, wherein, steps S1', S2', S3', and S4' in FIG. 4 are the same as or basically the same as the steps S11, S12, S13, and S14 in the embodiment of FIG. 1. Therefore, it will not be repeated here, and it is only included herein by reference. Preferably, the step S5' includes: adjusting a presentation form of the music score segment image on the playing interface corresponding to the target music video based on an adjustment operation on the music score segment image by a user.

In the embodiment, the user can adjust the music score segment image presented on the interface according to his own needs, so that a presentation form corresponding to the music score segment image is more in line with the user's experience needs. Specifically, adjustment buttons and adjustment mode prompt information can be set in the interface, and the corresponding adjustment operations can be implemented according to the corresponding adjustment mode prompt information by the user.

Preferably, wherein the adjustment operation includes but is not limited to at least any one of the following: a color adjustment operation; a position adjustment operation; a size adjustment operation; a shape adjustment operation; an opacity adjustment operation. In the embodiment, the user can adjust the color, position, size, shape, or image opacity of the music score segment image. Specifically, the corresponding adjustment operation can be implemented according to the buttons corresponding to each different adjustment operation. Herein, the present application does not limit the specific way of how to implement the adjustment operation.

Figure 5:
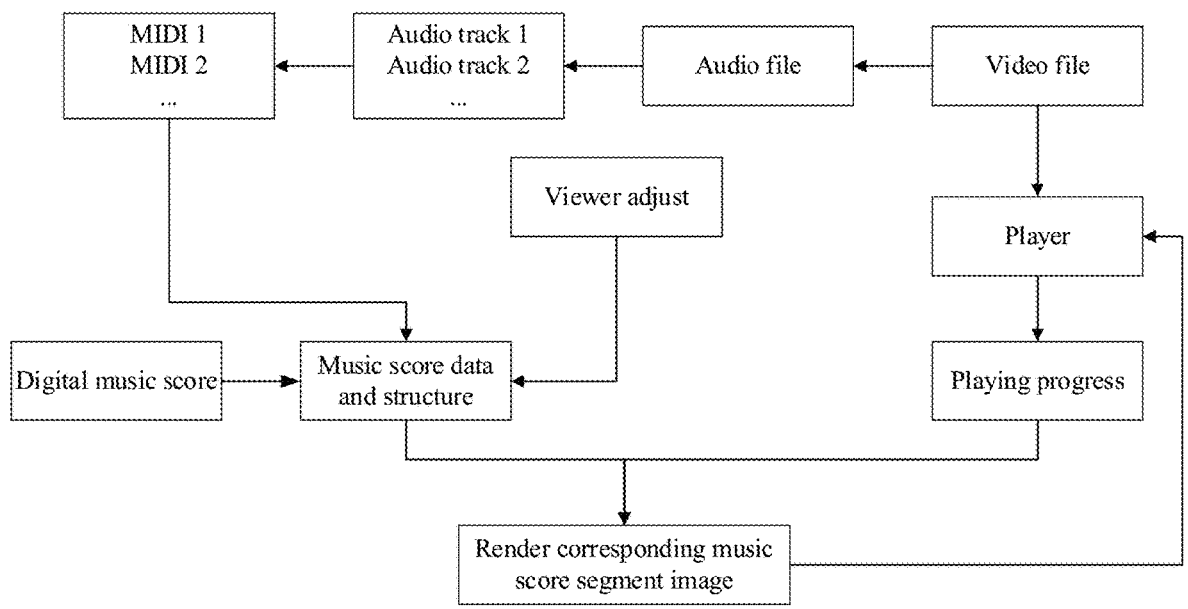
FIG. 5 shows a flowchart of a method for displaying music score in target music video according to another preferred embodiment of the present application.

FIG. 5 shows a flowchart of a method for displaying music score in target music video according to another preferred embodiment of the present application. In the embodiment, the corresponding audio file is extracted from the video file, and the different audio tracks are separated from the audio file, such as audio track 1, audio track 2, etc., and then the music score data structure is obtained by converting these audio tracks into MIDI, or the music score data structure can be obtained by digitizing the music score. Wherein the music score data structure can be adjusted by a viewer, then the corresponding music score segment image is rendered based on the music score data structure, thus the corresponding music score segment image can be superimposed on a player, so that the player can present the corresponding music score segment image when playing the video file.

Compared with the prior art, the present application determines the digital music score of the music corresponding to the target music video, and determines the digital score segment matched with the current playing progress of the target music video based on the playing progress of the target music video and the digital music score, and then, based on the preset condition, renders the digital music score segment to generate the corresponding music score segment image, and presents the music score segment image on the playing interface corresponding to the target music video. In this way, the display of music score segments in the music video is implemented, which enables the user to obtain the corresponding music score while watching the video, increases the way for the user to learn music, and improves the user experience.

Moreover, the present application can also present the music score segment image on the playing interface corresponding to the target music video in the form of comments, and adjust the presentation form of the music score segment image on the playing interface corresponding to the target music video based on the user's adjustment operation of the music score segment image, which increases the user experience by the way of comments, moreover, the user can adjust the music score segment image, which increases the flexibility of the presentation effect.

Figure 6:
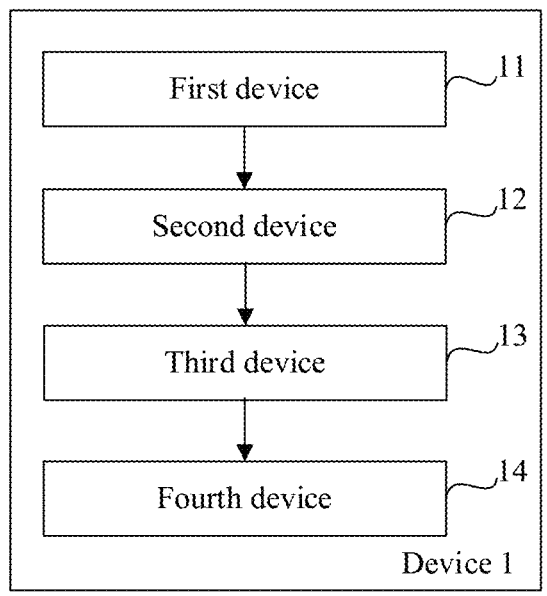
FIG. 6 shows a schematic diagram of a device for displaying music score in target music video according to another aspect of the present application.

FIG. 6 shows a schematic diagram of a device for displaying music score in target music video according to another aspect of the present application, the device 1 includes:

A first device 11, determining a digital music score of music corresponding to a target music video;

A second device 12, determining a digital music score segment matched with a current playing progress of the target music video based on a playing progress of the target music video and the digital music score;

A third device 13, rendering the digital music score segment to generate a corresponding music score segment image based on a preset condition;

A fourth device 14, presenting the music score segment image on a playing interface corresponding to the target music video.

In the present application, the method is executed by the device 1, and the device 1 includes at least any one of a user terminal device or a network device. Specifically, the above steps may be executed by the user terminal device, or some steps may be executed by the user terminal device and some steps may be executed by the network device, so as to be implemented by the cooperation of the user device and the network device, which is not limited in the solution. Wherein, when the device 1 is a network device, the device 1 includes, but is not limited to, a computing device and/or cloud. The computing device includes, but is not limited to, a personal computer, a notebook computer, an industrial computer, a network host, a single network server, and multiple network server sets; the cloud is composed of a large number of computers or network servers based on Cloud Computing, wherein, the Cloud Computing is a kind of distributed computing, which is a virtual supercomputer composed of a group of loosely coupled computer sets.

When the device 1 is a user terminal device, the device 1 includes but is not limited to various intelligent terminals, such as smart phones, mobile intelligent devices, personal computers, etc. Herein, the computing device and/or the cloud are only examples, and other existing or possible future device and/or resource sharing platforms, if applicable to the present application, shall also be included in the protection scope of the present application, and are included here by reference.

In the embodiment, the first device of the device 1 is configured to determine the digital music score of the music corresponding to the target music video. Wherein, the target music video includes video contents and corresponding music content. In the step, the digital music score corresponding to the music contents needs to be determined. Specifically, the user can search for corresponding digital music score according to the music, and upload the searched digital music score to the device 1.

Preferably, wherein, the first device: searching in a digital music score database based on the target music video to determine the digital music score corresponding to the target music video.

In the embodiment, a digital score database can be established in advance, and the digital score database can be saved according to a music name or an audio track, and then search in the digital score database according to the music name or the audio track corresponding to the target music video to determine the digital score corresponding to the target music video. Herein, the search method is only an example and is not specifically limited.

Preferably, wherein, the establishment of the digital music score database includes: separating a corresponding audio from an obtained music video and separating different audio tracks from the audio; generating the digital music score corresponding to the audio based on the different audio tracks to establish the digital music score database. Through the establishment of the digital music score database, it is convenient to search the corresponding digital music score.

Specifically, a large number of music videos can be obtained in advance and the corresponding audios can be separated from the obtained music videos, and then different audio tracks can be separated from the corresponding audios. Then, the digital music scores corresponding to the audios are generated and saved based on the different audio tracks, so as to establish the digital music score database. Specifically, the audio track can be converted into MIDI (Musical Instrument Digital Interface), and information such as sound frequency, amplitude, and waveform in an MIDI file can be analyzed to generate a corresponding digital score database.

In addition, the user can also upload a corresponding digital score to create or update the digital score database. The above method of establishing a digital music score database is only an example, and other existing or possible future methods, if applicable to the present application, shall also be included in the protection scope of the present application, and are included herein by reference.

Continuing in the embodiment, the second device of the device 1 determines the digital music score segment matched with the current playing progress of the target music video based on the playing progress of the target music video and the digital music score.

Specifically, the digital music score segment can be marked with time units, and then playing progress time information of the target music video can be corresponded to time information of the digital music score to determine a time point of the digital music score corresponding to a time point of the current playing progress, and digital score between the time point of the current playing progress and a time point of a next preset time interval is determined as the digital music score segment matched with the current playing progress of the target music video. Through the way of time marking, the corresponding digital music score segment can be matched quickly, and the matching efficiency is improved.

Preferably, wherein, the device further includes: a fifth device (not shown), analyzing the digital music score to determine a corresponding digital music score data structure; wherein, the second device:

determining the digital music score segment matched with the playing progress of the target music video based on the playing progress of the target music video and the digital music score data structure corresponding to the digital music score.

In the embodiment, data structure information of the digital music score can be determined through the analysis of the digital music score. The data structure information is configured to accurately record the digital music score, and the data structure information corresponds to the whole music process, so that the playing progress of the target music video and the digital music score data structure corresponding to the digital music score can be matched to determine a data structure part corresponding to the current playing progress. Then, the data structure part corresponding to the current playing progress and time structure part of a next preset segment are regarded as the digital music score segment matching the playing progress of the target music video.

Herein, the above method of determining the digital music score segment matching the current playing progress of the target music video is only an example, and other existing or possible methods in the future, if applicable to the application, should also be included in the protection scope of the application, and are included herein by reference.

Preferably, wherein, the device further includes: a sixth device (not shown), adjusting the digital music score data structure when the digital music score segment does not match the playing progress of the target music video.

In the embodiment, if the digital music score segment cannot match the playing progress of the target music video, the digital music score data structure can be adjusted accordingly to make the digital music score segment match the playing progress of the target music video.

Continuing in the embodiment, the third device of the device 1, rendering the digital music score segment to generate the corresponding music score segment image based on the preset condition.

Specifically, in order to make the user have a better experience, the digital music score segment will be rendered to generate the corresponding music score segment image. Specifically, for the same digital music score segment, it can be rendered into different forms of music score segment images such as staff score, numbered musical notation, musical instrument fingering, etc. The specific rendered image can be limited based on the preset conditions. Herein, the music score segment image is only an example, and other graphical forms that can be applied to the present application are also included in the application.

Preferably, wherein, the preset condition includes any one of the following: a current selection operation on a type of the music segment image by a user; a historical selection operation on a type of the music segment image by a user; a musical instrument corresponding to the target music video.

Wherein, when the preset condition is the current selection operation of the type of the music score segment image by the user, the user can select a desired type of the music score segment image by himself. For example, the device 1 may provide a selection button for the user to select. Wherein, the types of the music score segment images include, but are not limited to, different types such as staff score, numbered notation, guitar notation, and musical instrument fingering.

When the preset condition is the historical selection operation of the type of the musical score segment image by the user, the device 1 can automatically determine the type for the user according to the historical selection operation by the user. For example the type frequently selected by the user can be determined as the current type of the musical score segment image, or, the type last selected is taken as the current type of the music score segment, etc.

When the preset condition is the musical instrument corresponding to the target music video, the method further includes determining the musical instrument corresponding to the music in the target music video, and rendering the digital music score segment to generate a music score segment image corresponding to the musical instrument. For example, the fingering of the musical instrument is provided to the user as a music score segment image. For example, if it is determined that the musical instrument is a piano, the piano fingering segment image may be provided to the user.

Continuing in the embodiment, the fourth device of the device 1, presenting the music score segment image on a playing interface corresponding to the target music video. Specifically, the music score segment image may be covered over the target music video to be presented to the user.

Preferably, wherein, the fourth device, presenting the music score segment image on the playing interface corresponding to the target music video in a form of moving across at least on frame of the target music video. Specifically, the music score segment image can be presented on the playing interface corresponding to the target music video in a form similar to a text comments, and the music score segment image changes with time.

According to another aspect of the present application, a device 2 there is also provided for displaying music scores in target music video, and the device 2 includes:

A first first device, determining a digital music score of music corresponding to a target music video;

A first second device, determining a digital music score segment matched with a current playing progress of the target music video based on a playing progress of the target music video and the digital music score;

A first third device, rendering the digital music score segment to generate a corresponding music score segment image based on a preset condition;

A first fourth device, presenting the music score segment image on a playing interface corresponding to the target music video;

A first fifth device, adjusting a presentation form of the music score segment image on the playing interface corresponding to the target music video based on an adjustment operation on the music score segment image by a user.

In the embodiment, the first first device, the first second device, the first third device and the first fourth device are the same as or basically the same as the he first device, the second device, the third device and the fourth device in the embodiment of FIG. 1. It will not be repeated herein.

In the embodiment, the user can adjust the music score segment image presented on the interface according to his own needs, so that the presentation form corresponding to the music score segment image is more in line with the user's experience needs. Specifically, adjustment buttons and adjustment mode prompt information can be set in the interface, and the corresponding adjustment operations can be implemented according to the corresponding adjustment mode prompt information by the user.

Preferably, wherein the adjustment operation includes but is not limited to at least any one of the following: a color adjustment operation; a position adjustment operation; a size adjustment operation; a shape adjustment operation; an opacity adjustment operation. In the embodiment, the user can adjust the color, position, size, shape, or image opacity of the music score segment image. Specifically, the corresponding adjustment operation can be implemented according to the buttons corresponding to each different adjustment operation. Herein, the present application does not limit the specific way of how to implement the adjustment operation.

Compared with the prior art, the present application determines the digital music score of the music corresponding to the target music video, and determines the digital score segment matched with the current playing progress of the target music video based on the playing progress of the target music video and the digital music score, and then, based on the preset condition, renders the digital music score segment to generate the corresponding music score segment image, and presents the music score segment image on the playing interface corresponding to the target music video. In this way, the display of music score segments in the music video is implemented, which enables the user to obtain the corresponding music score while watching the video, increases the way for the user to learn music, and improves the user experience.

Moreover, the present application can also present the music score segment image on the playing interface corresponding to the target music video in the form of comments, and adjust the presentation form of the music score segment image on the playing interface corresponding to the target music video based on the user's adjustment operation of the music score segment image, which increases the user experience by the way of comments, moreover, the user can adjust the music score segment image, which increases the flexibility of the presentation effect.

In addition, the embodiment of the application also provides a computer-readable medium, which stores computer-readable instructions, and the computer-readable instructions can be executed by a processor to implement the above method.

The embodiment of the application also provides a device for displaying music score in target music video, wherein the device comprises:
one or more processors; and
a memory storing computer-readable instructions, and the computer-readable instructions, when executed, cause the processors to perform operations of the above method.

For example, the computer-readable instructions, when executed, cause the one or more processors to: determine a digital music score of music corresponding to a target music video; determine a digital music score segment matched with a current playing progress of the target music video based on a playing progress of the target music video and the digital music score; render the digital music score segment to generate a corresponding music score segment image based on a preset condition; present the music score segment image on a playing interface corresponding to the target music video.

Figure 7:
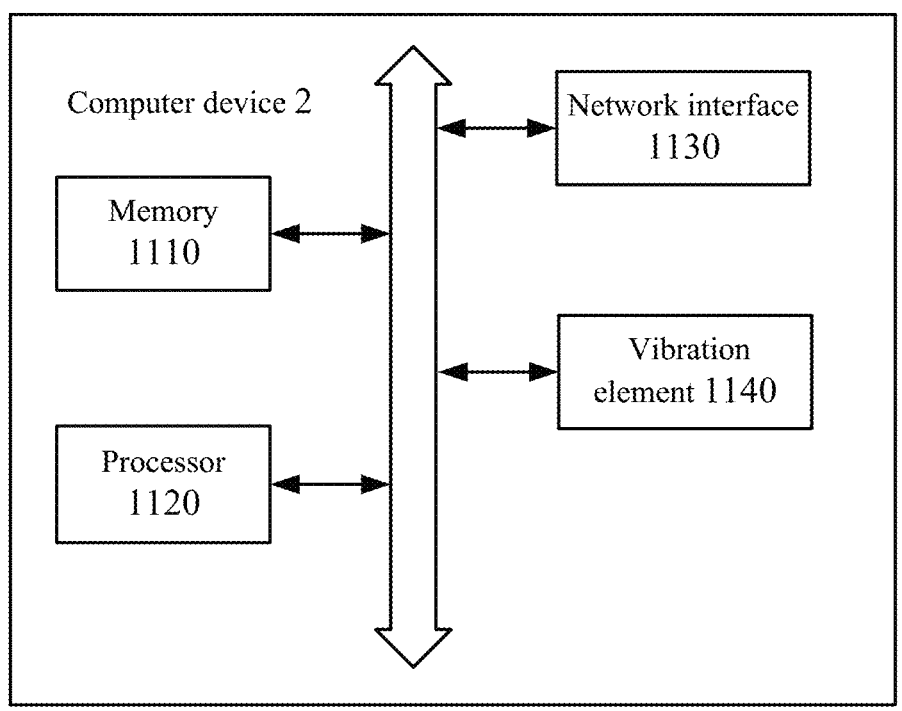
FIG. 7 schematically shows a schematic diagram of a hardware architecture of a computer device suitable for implementing the techniques described in the present application.

FIG. 7 schematically shows a schematic diagram of a hardware architecture of a computer device 2 suitable for implementing the techniques described in the present application. In the embodiment, the computer device 2 is a device capable of automatically performing numerical calculations and/or information processing according to predefined or stored instructions, such as can be a smartphone, a tablet, a laptop, a desktop computer, a rack server, a blade server, a tower server or a rack server (including independent servers, or server clusters composed of multiple servers), etc. As shown in FIG. 7, the computer device 2 includes, but is not limited to, a memory 1110, a processor 1120, a network interface 1130, and a vibration element 1140 that can be communicated with each other through a system bus. Wherein:

The memory 1110 includes at least one type of computer-readable storage medium. The readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical dis and so on. In some embodiments, the memory 1110 may be an internal storage module of the computer device 2 such as a hard disk or memory of the computer device 2. In other embodiments, the memory 1110 may also be an external storage device of the computer device 2, such as a plugged hard disk provided in the computer device 2, a smart media card (SMC), secure digital (SD) card, a flash memory card, and so on. Of course, the memory 1110 may also include both an internal storage module and an external storage device of the computer device 2. In the embodiment, the memory 1110 is generally used to store an operating system and various types of application software installed in the computer device 2 such as program codes of the game playing method based on a multimedia file and the like. In addition, the memory 1110 may also be used to temporarily store various types of data that have been or will be outputted.

The processor 1120, in some embodiments, may be a central processing unit (CPU), a controller, a microprocessor, or other data processing chip. The processor 1120 is generally used to control the overall operation of the computer device 2 such as performing control and processing related to data interaction or communication with the computer device 2. In the embodiment, the processor 1120 is used to run program code stored in the memory 1110 or process data.

The network interface 1130 may include a wireless network interface or a wired network interface which is generally used to establish a communication connection between the computer device 2 and other computer devices. For example, the network interface 1130 is used for connecting the computer device 2 to an external terminal via a network and establishing a data transmission channel and a communication connection between the computer device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and so on.

It is to be noted that FIG. 7 shows only the computer device 2 having components 1110-1130, but it is understood that it is not required to implement all of the shown components and that more or fewer parts can be implemented in lieu thereof.

In the embodiment, the game playing method based on a multimedia file stored in the memory 1110 may be divided into one or more program modules and executed by one or more processors (processor 1120 in the embodiment) to complete the embodiment of the present application. For those skilled in the art, it is obvious that the invention is not limited to the details of the above exemplary embodiments, and can be implemented in other specific forms without departing from the spirit or basic features of the invention. Therefore, no matter from which point of view, the embodiments should be regarded as be exemplary and non restrictive. The scope of the invention is limited by the attached claims rather than the above description. Therefore, it is intended to include all changes within the meaning and scope of the equivalent elements of the claims in the invention. Any reference mark in the claims shall not be regarded as limiting the claims concerned. In addition, it is clear that the word "including" does not exclude other units or steps, and the singular does not exclude the plural. The multiple units or devices stated in the device claim can also be implemented by one unit or device through software or hardware. The first and second words are used to denote names, not any particular order.

What is claimed is:

1. A method for displaying images of music score segments in a target music video, the method implemented by a computing device, the method comprising:
   receiving the target music video for playback on the computing device;
   separating an audio track of music from the target music video;
   determining a digital music score corresponding to the audio track of music comprised in the target music video, wherein the digital music score comprises a plurality of digital music score segments arranged in a time order;
   determining a first segment of the plurality of digital music score segments having a first time in the time order, the first time corresponding to a time of playing the target music video;
   generating an image of a music score segment corresponding to the first segment of the plurality of digital music score segments based on a predetermined condition; and
   presenting the image in a corresponding interface of playing the target music video at the time on the computing device.

2. The method of claim 1, further comprising:
   determining a data structure of the digital music score; and
   determining the first segment of the plurality of digital music score segments having the first time in the time order based on the time of playing of the target music video and the data structure of the digital music score.

3. The method of claim 2, further comprising:
   adjusting the data structure of the digital music score when the digital music score does not match the time of playing of the target music video.

4. The method of claim 1, wherein the predetermined condition comprises at least one of:
   a musical instrument corresponding to the target music video;
   a selection of a type of the image by a user; or
   a history of selections made by the user of the type of the image.

5. The method of claim 1, further comprising:
   presenting the image on the interface while playing the target music video by moving the image relative to at least one frame of the target music video.

6. The method of claim 1, further comprising:
   adjusting a form of presenting the image on the interface while playing the target music video based on user input.

7. The method of claim 6, further comprising at least one of:
   adjusting a color of the image;
   adjusting a position of the image;
   adjusting a size of the image;
   adjusting a shape of the image; or
   adjusting an opacity of the image.

8. The method of claim 1, wherein the determining the digital music score corresponding to the audio track of music comprised in the target music video further comprises:
   searching a database comprising a plurality of digital music scores based on the target music video.

9. The method of claim 1, further comprising:
   establishing a database comprising a plurality of digital music scores, wherein the determining the digital music score corresponding to the audio track of music comprises retrieving the corresponding digital music score from the database.

10. The method of claim 9, wherein the establishing the database comprising the plurality of digital music scores further comprising:
    separating a corresponding audio from one of a plurality of music videos;
    separating different audio tracks from the corresponding audio separated from the plurality of music videos; and
    generating one of the plurality of digital music scores based on the different audio tracks and storing the plurality of digital music scores in the database based corresponding to the different audio tracks.

11. A system, comprising:
    at least one processor; and
    at least one memory communicatively coupled to the at least one processor and comprising computer-readable instructions that upon execution by the at least one processor cause the at least one processor to perform operations comprising:
    processing a received target music video for playback by the at least one processor;
    separating an audio track of music from the target music video;
    determining a digital music score corresponding to the audio track of music comprised in the target music video, wherein the digital music score comprises a plurality of digital music score segments arranged in a time order;

determining a first segment of the plurality of digital music score segments having a first time in the time order, the first time corresponding to a time of playing the target music video;

generating an image of a music score segment corresponding to the first segment of the plurality of digital music score segments digital music score based on a predetermined condition; and presenting the image in a corresponding interface of playing the target music video at the time, the corresponding interface associated with the at least one processor.

12. The system of claim 11, the operations further comprising:

determining a data structure of the digital music score; and determining the first segment of the plurality of digital music score segments having the first time in the time order based on the time of playing of the target music video and the data structure of the digital music score.

13. The system of claim 12, the operations further comprising:

adjusting the data structure of the digital music score when the digital music score does not match the time of playing of the target music video.

14. The system of claim 11, the operations further comprising:

presenting the image on the interface while playing the target music video in a form by moving the image relative to at least one frame of the target music video.

15. The system of claim 11, wherein the determining the digital music score corresponding to the audio track of music comprised in the target music video further comprises:

searching a database comprising a plurality of digital music scores based on the target music video.

16. The system of claim 11, the operations further comprising:

establishing a database comprising a plurality of digital music scores, wherein the establishing the database comprising the plurality of digital music scores further comprises:

separating a corresponding audio from one of a plurality of music videos;

separating different audio tracks from the corresponding audio separated from the plurality of music videos; and generating one of the plurality of digital music scores based on the different audio tracks and storing the plurality of digital music scores in the database based on corresponding to the different audio tracks.

17. A non-transitory computer-readable storage medium, storing computer-readable instructions that upon execution by a processor cause the processor to implement operations comprising:

processing a received target music video for playback by the processor;

separating an audio track of music from the target music video;

determining a digital music score corresponding to the audio track of music comprised in the target music video, wherein the digital music score comprises a plurality of digital music score segments arranged in a time order;

determining a first segment of the plurality of digital music score segments having a first time in the time order, the first time corresponding to a time of playing the target music video;

generating an image of a music score segment corresponding to the first segment of the plurality of digital music score segments based on a predetermined condition; and presenting the image in a corresponding interface of playing the target music video at the time, the corresponding interface associated with the at least one processor.

18. The non-transitory computer-readable storage medium of claim 17, the operations further comprising:

determining a data structure of the digital music score; and determining the first segment of the plurality of digital music score segments having the first time in the time order based on the time of playing of the target music video and the data structure of the digital music score.

19. The non-transitory computer-readable storage medium of claim 17, the operations further comprising:

presenting the image on the interface while playing the target music video by moving the image relative to at least one frame of the target music video.

20. The non-transitory computer-readable storage medium of claim 17, wherein the determining digital music score corresponding to the audio track of music comprised in the target music video further comprises:

searching a database comprising a plurality of digital music scores based on the target music video.

* * * * *